US008960721B2

(12) United States Patent
Moriyama (10) Patent No.: US 8,960,721 B2
(45) Date of Patent: Feb. 24, 2015

(54) STEERING COLUMN APPARATUS (71) Applicant: NSK Ltd., Tokyo (JP)

(72) Inventor: Seiichi Moriyama, Gunma (JP)

(73) Assignee: NSK Ltd, Tokyo (JP)

( * ) Notice: Subject to any disclaimer, the term of this patent is extended or adjusted under 35 U.S.C. 154(b) by 0 days.

(21) Appl. No.: 14/239,982

(22) PCT Filed: Oct. 24, 2012

(86) PCT No.: PCT/JP2012/077514
§ 371 (c)(1),
(2) Date: Feb. 20, 2014

(87) PCT Pub. No.: WO2013/080716
PCT Pub. Date: Jun. 6, 2013

(65) Prior Publication Data
US 2014/0251061 A1 Sep. 11, 2014

(30) Foreign Application Priority Data
Dec. 2, 2011 (JP) ................................. 2011-264172

(51) Int. Cl.
*B62D 1/19* (2006.01)
*B62D 1/187* (2006.01)
*B62D 1/184* (2006.01)

(52) U.S. Cl.
CPC ............... *B62D 1/187* (2013.01); *B62D 1/184* (2013.01); *B62D 1/195* (2013.01)
USPC ....................................................... 280/777

(58) Field of Classification Search
USPC ....................................................... 280/777
See application file for complete search history.

(56) References Cited

U.S. PATENT DOCUMENTS 5,131,286 A * 7/1992 Sturges et al. .................. 74/492
6,290,258 B1 * 9/2001 Parkinson et al. ............ 280/775
(Continued)

FOREIGN PATENT DOCUMENTS

| JP | S50-055034 A | 5/1975 |
| JP | S59-147673 U | 10/1984 |
| JP | S62-101578 A | 5/1987 |

(Continued)

OTHER PUBLICATIONS

International Search Report from the International Bureau of WIPO for International Application No. PCT/JP2012/077514 dated Jan. 29, 2013 (4 pages).

*Primary Examiner* — Drew Brown
(74) *Attorney, Agent, or Firm* — Fitch Even Tabin & Flannery LLP (57) ABSTRACT

Construction of a steering column apparatus used in a tilt steering apparatus is achieved that is capable of reducing impact applied to the driver's body even when an adjustment rod is forcibly pressed against the front edges of long holes in the up-down direction during a secondary collision. Through holes that are continuous along the long holes in the up-down direction from the top end portion to the bottom end portion of the long holes in the up-down direction, and are formed in portions of a pair of left and right support plate portions of the support bracket that are further toward the front side than the long holes in the up-down direction. Bridge portions are provided between the front side edges of the long holes in the up-down direction and the rear side edges of the through holes. The bridge portions reduce impact by plastically deforming in the forward direction due to an impact load that is applied in the forward direction from the steering column by way of the adjustment rod during a collision accident.

6 Claims, 8 Drawing Sheets

(56) References Cited

U.S. PATENT DOCUMENTS

| | | | |
|---|---|---|---|
| 7,699,344 B2* | 4/2010 | Moriyama et al. | 280/775 |
| 8,539,855 B2* | 9/2013 | Schnitzer | 74/493 |
| 2006/0151984 A1* | 7/2006 | Higashino et al. | 280/775 |
| 2007/0068311 A1* | 3/2007 | Shimoda et al. | 74/493 |
| 2008/0252056 A1* | 10/2008 | Moriyama et al. | 280/775 |
| 2013/0213173 A1* | 8/2013 | Moriyama | 74/493 |

FOREIGN PATENT DOCUMENTS

| | | |
|---|---|---|
| JP | H01-249571 A | 10/1989 |
| JP | H01-175968 U | 12/1989 |
| JP | 2595547 Y2 | 3/1999 |
| JP | 2000-043738 A | 2/2000 |
| JP | 2010-052639 A | 3/2010 |
| JP | 2010-173552 A | 8/2010 |
| WO | 2007/097340 A1 | 8/2007 |

* cited by examiner

STEERING COLUMN APPARATUS

CROSS-REFERENCE TO RELATED APPLICATIONS

This application is a U.S. national phase application filed under 35 U.S.C. §371 of International Application PCT/JP2012/077514, filed on Oct. 24, 2012, designating the United States, which claims priority from Japanese Application 2011-264172, filed Dec. 2, 2011, which are hereby incorporated herein by reference in their entirety.

TECHNICAL FIELD

The present invention relates to a steering column apparatus that constitutes a tilt steering apparatus that makes it possible to adjust the up-down position of a steering wheel, and that rotatably supports a steering shaft which supports the steering wheel relative to a vehicle body.

BACKGROUND ART

Figure 1:
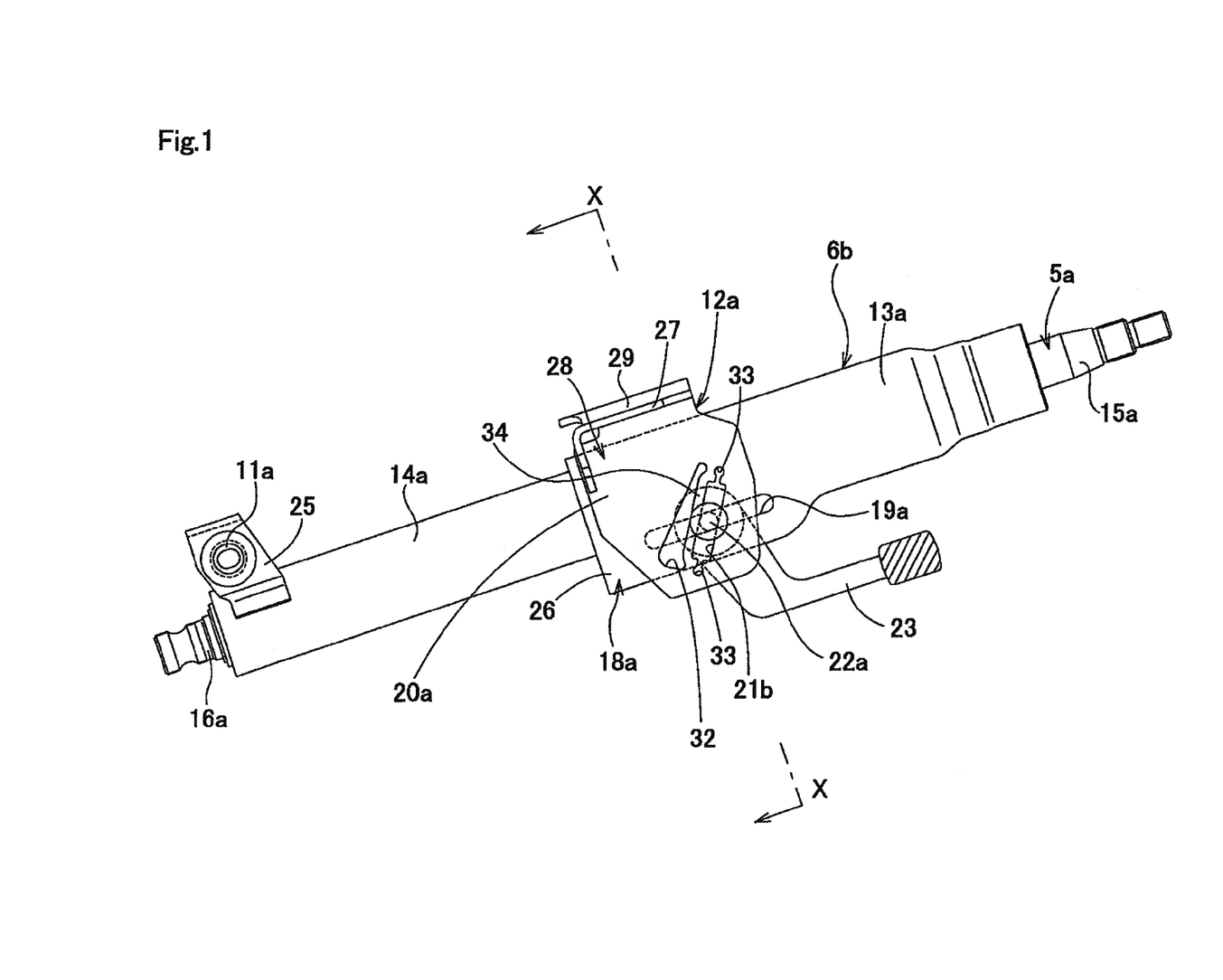
FIG. 1 is a side view illustrating an example of an embodiment of the present invention.
Figure 2:
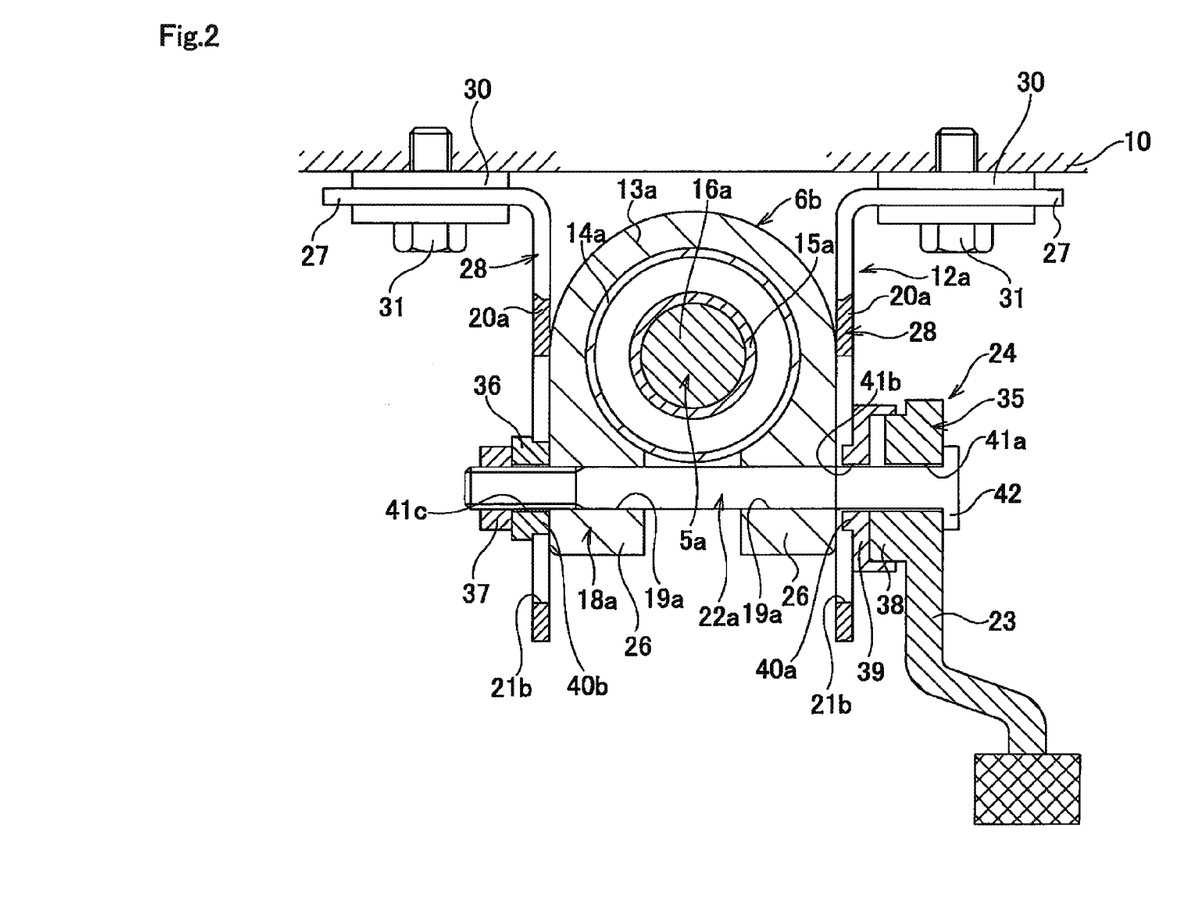
FIG. 2 is an enlarged cross-sectional view of section X-X in FIG. 1.
Figure 3:
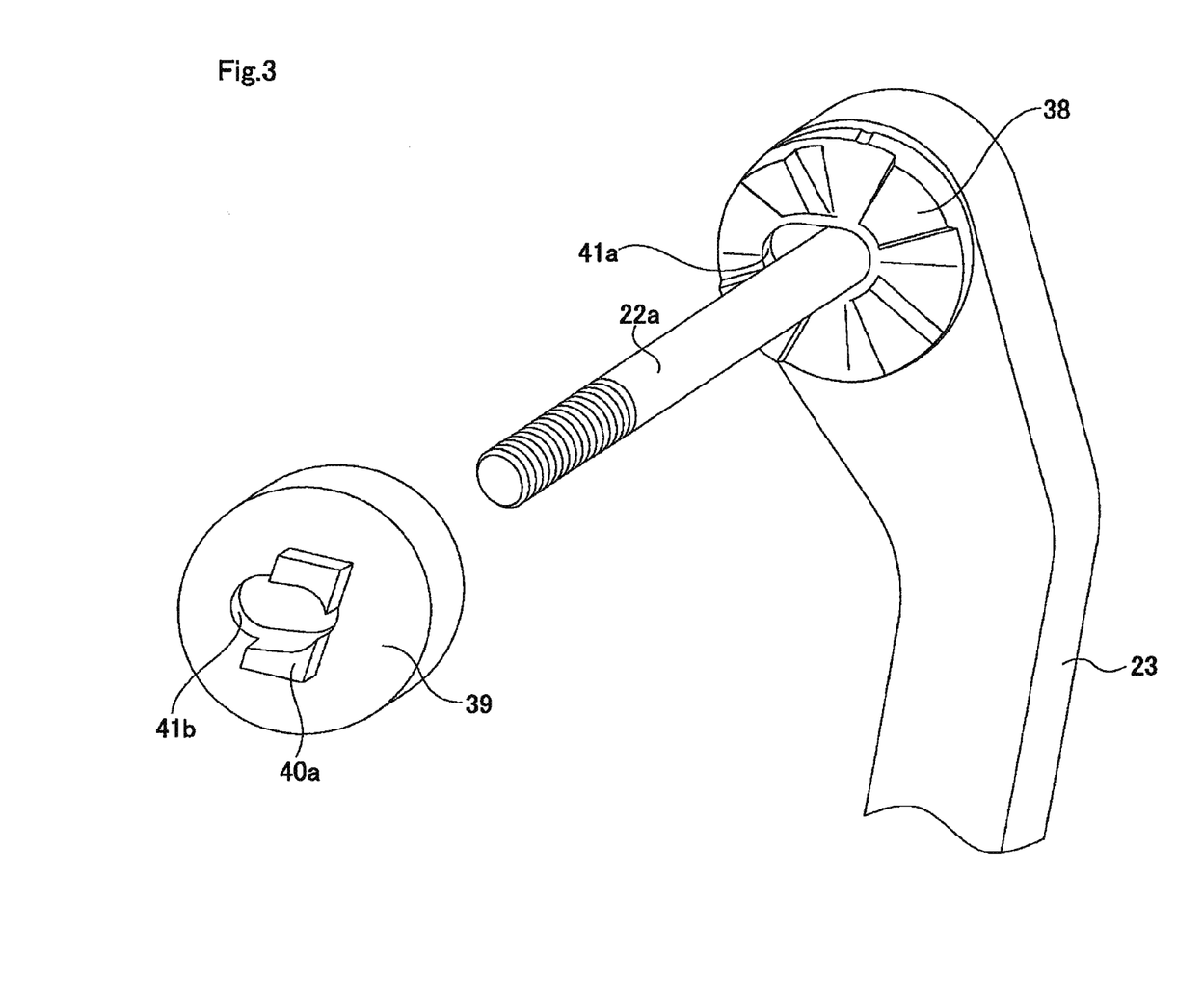
FIG. 3 is a perspective view illustrating the base end portion of an adjustment lever having a driving cam provided on the inside surface thereof, an adjustment rod, and a driven cam as seen from the front left side in FIG. 2.
Figure 4:
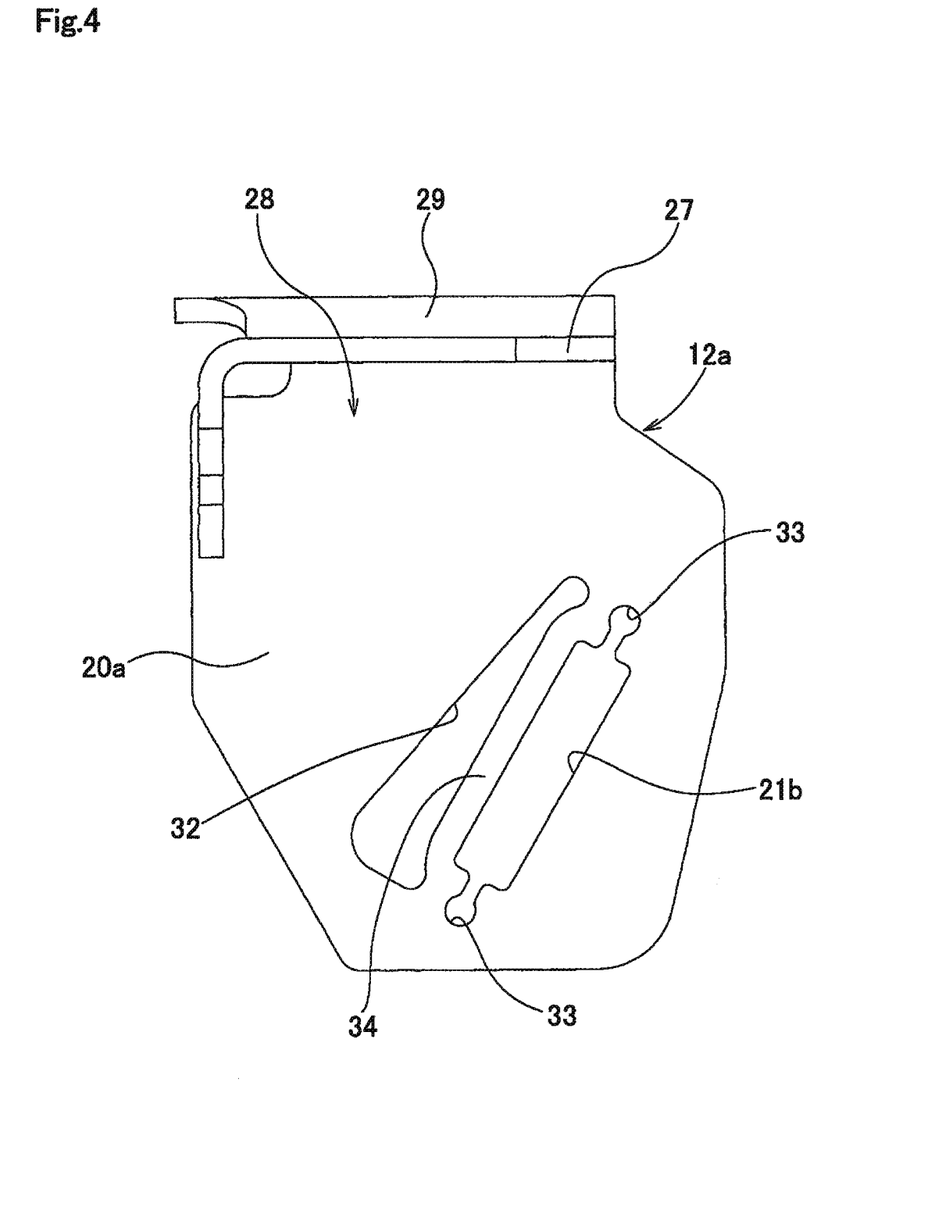
FIG. 4 is a side view of a removed support bracket as seen from the same direction in FIG. 1.
Figure 5:
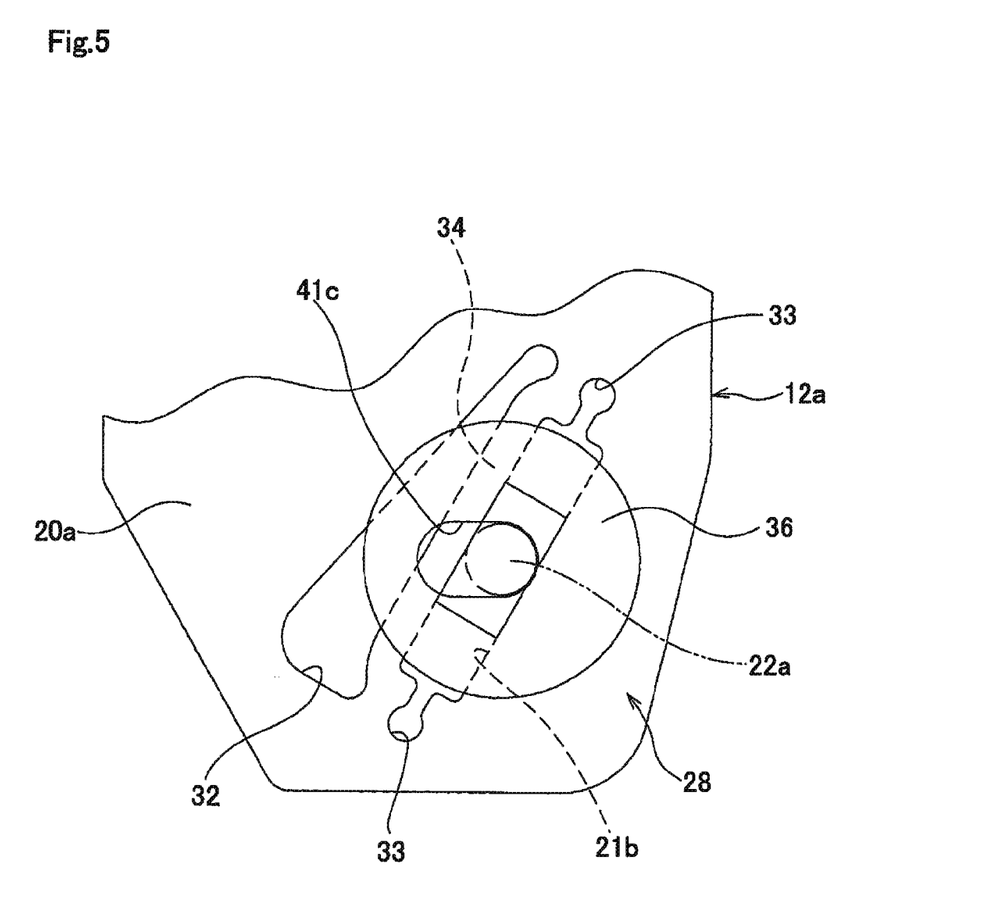
FIG. 5 is a side view illustrating an assembled adjustment rod and pressure member, and corresponds to the lower half portion in FIG. 4.
Figure 6:
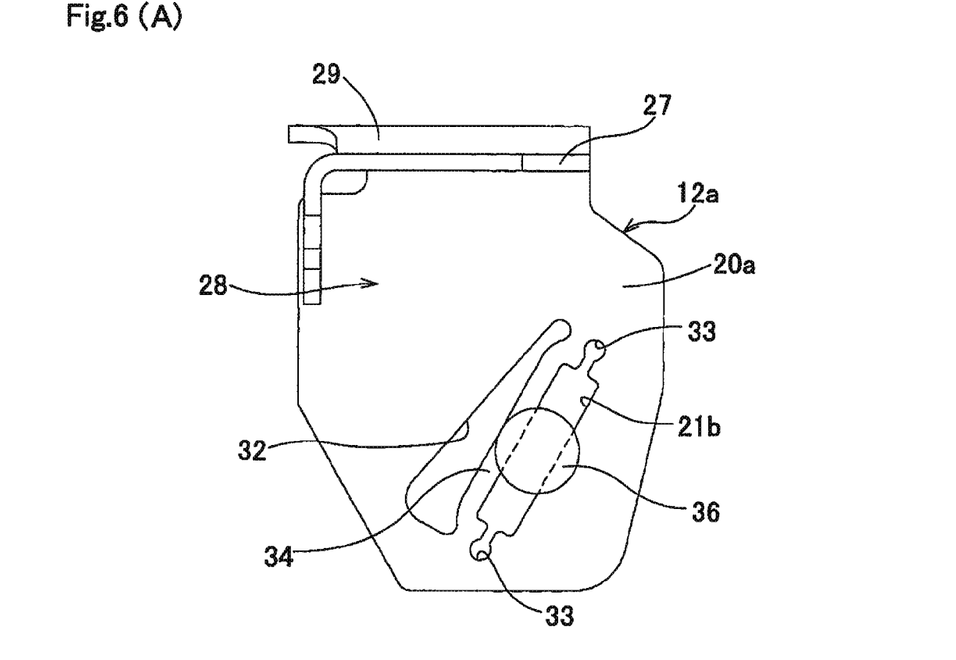
Figure 7:
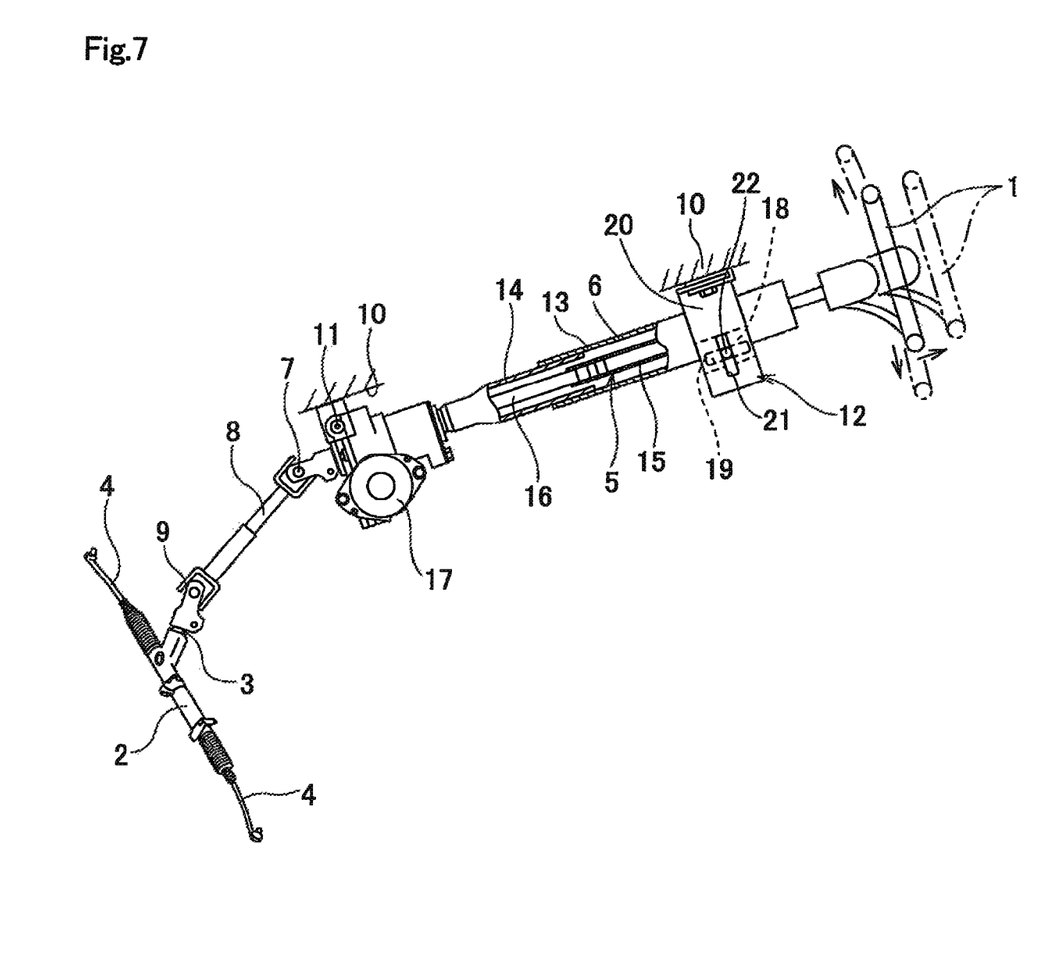
FIG. 7 is a partial cross-sectional side view illustrating a first example of a conventional tilt steering apparatus.

As illustrated in FIG. 7, a steering apparatus for an automobile is constructed to transmit a rotation of a steering wheel 1 to an input shaft 3 of a steering gear unit 2, and the rotation of the input shaft 3 pushes or pulls a pair of left and right tie rods 4 to apply a steering angle to the front wheels. The steering wheel 1 is supported by and fastened to the rear end portion of a steering shaft 5, and the steering shaft 5 passes in the axial direction through a cylindrical steering column 6, and is rotatably supported by the steering column 6. The front end portion of the steering shaft 5 is connected to the rear end portion of an intermediate shaft 8 by way of a universal joint 7, and the front end portion of the intermediate shaft 8 is connected to the input shaft 3 by way of another universal joint 9.

In this kind of steering apparatus, a tilt mechanism for adjusting the up-down position and/or a telescopic mechanism for adjusting the forward-backward position of the steering wheel 1 has been conventionally and widely equipped. In order to construct a tilt mechanism in the steering apparatus, the steering column 6 is supported by the vehicle body 10 so as to be able to pivotally displace around a pivot shaft 11 that is arranged in the width direction (the width direction is the width direction of the vehicle body, and is the left-right direction). Moreover, a displacement bracket that is fastened to a portion near the rear end of the steering column 6 is supported by a support bracket 12 that is supported by the vehicle body 10 so as to be able to displace in the up-down direction and forward-backward direction (the forward-backward direction is the forward-backward direction of the vehicle body). In the meantime, in order to construct a telescopic mechanism in the steering apparatus, the steering column 6 is constructed by telescopically combining an outer column 13 and an inner column 14 so as to be able to freely extend or contract. Further, the steering shaft 5 is constructed by combining an outer shaft 15 and inner shaft 16 by a spline fit or the like so as to be able to freely transmit torque as well as freely extend and contract. In the illustrated example, an electric power steering apparatus which reduces the force required for operating the steering wheel 1 by using an electric motor 17 as an auxiliary power source is also assembled.

In the case of a manual tilt mechanism and telescopic mechanism, a state of being able to adjust a position of the steering wheel 1 and a state of securing the steering wheel 1 after adjustment are switched by operating an adjustment lever. Various kinds of construction are conventionally known for such a manual tilt mechanism and telescopic mechanism. For example, in the case of the construction illustrated in FIG. 7, long holes 19 in the forward-backward direction that extend in the axial direction of the outer column 13 are formed in the displacement bracket 18 that is fastened to the outer column 13. Moreover, the support bracket 12 has a pair of support plate portions 20 that hold the displacement bracket 18 from left and right sides, and long holes 21 in the up-down direction in portions of the support plate portions 20 that are aligned with each other. An adjustment rod 22 is inserted through the long holes 21 in the up-down direction and the long holes 19 in the forward-backward direction. A pair of pressure portions are provided on this adjustment rod 22 on both side in the width direction of the pair of support plate portions 20 to hold the pair of support plate portions 20, and an expansion and contraction apparatus that operates based on the operation of the adjustment lever 23 (see FIG. 8) enable a space between these pressure portions to expand or contract.

When adjusting the up-down position and the forward-backward position of the steering wheel 1, the expansion and contraction apparatus expands the space between the pressure portions by turning the adjustment lever 23 in a specified direction (typically, downward). In this state, the surface pressure at the sliding contact portion between the inside surfaces of the support plate portions 20 and the outside surfaces of the displacement bracket 18 is reduced or lost. In this state, the position of the steering wheel 1 can be adjusted by displacing the outer column 13 within the range that the adjustment rod 22 is capable of displacing inside the long holes 21 in the up-down direction and the long holes 19 in the forward-backward direction. After the steering wheel 1 has been moved to a desired position, the adjustment lever 23 is rotated in an opposite direction of the specified direction to contract the space between the pressure portions, such that the displacement bracket 18 is firmly held by the support plate portions 20 from both sides in the width direction thereof. As a result, the steering wheel 1 is maintained in an adjusted position.

This kind of steering apparatus is also often equipped with a mechanism for protecting the driver from impact during a secondary collision that occurs when the driver collides with the steering wheel when an automobile is in a collision accident or the like. The construction of this kind of mechanism is widely known, as disclosed in JP S50-55034 (A), JP H01-249571 (A), JP 2000-043738 (A), JP S59-147673 (U), JP H01-175968 (U), and JP 2,595,547 (Y2). JP 2000-043738 (A) and JP 2,595,547 (Y2) disclose a tilt steering apparatus having construction in which by forming a slit next to tilting long holes that are formed in support plate portions of a support bracket, part of the support bracket plastically deforms, which reduces the impact that is applied to the driver's body during a secondary collision. However, the construction disclosed in JP 2000-043738 (A) is for a tilt steering apparatus for a cab-over-engine automobile in which the angle of the center axis of the steering column with respect to the horizontal direction is about 58 degrees to 75 degrees (angle near vertical). Therefore, construction for allowing part of the support plate portions to plastically deform during a secondary collision is also special and cannot be applied to a tilt steering apparatus for a typical automobile in which the center axis of the steering column is close to the horizontal direction (the angle of the center axis with respect to the horizontal direction being about 10 degrees to 40 degrees).

On the other hand, JP 2,595,547 (Y2) discloses construction that, part of the support plate portions plastically deforms when a steering lock mechanism has collided with the rear end edge of the support plate portions due to a secondary collision. This conventional construction is effective in the case of a steering apparatus having construction in which, when the steering column has displaced forward due to a secondary collision, the steering lock mechanism collides with the rear end edge of the support plate portions before impact energy is applied to the adjustment rod. However, in the case of typical construction in which the adjustment rod is strongly pressed against the front edges of the long holes in the up-down direction, it is not always possible to reduce the impact that is applied to the driver's body.

Figure 8:
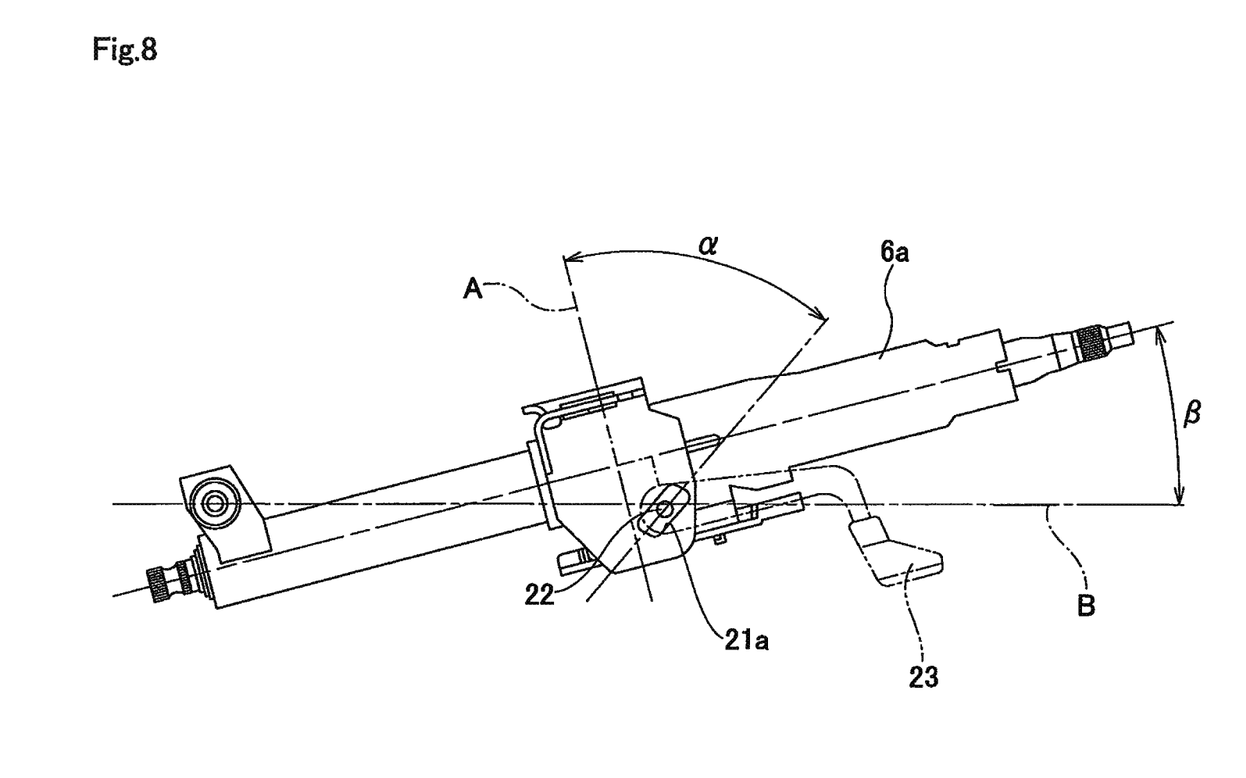
FIG. 8 is a side view illustrating a second example of a conventional tilt steering apparatus.

Furthermore, JP 2010-052639 (A) discloses construction for preventing a steering wheel to displace upward as a secondary collision proceeds. In this construction, as illustrated in FIG. 8, regardless of the up-down position of the steering wheel 1 (see FIG. 7), the inclination angle α of long holes 21a in the up-down direction with respect to a virtual plane A that is orthogonal to the center axis of the steering column 6a is greater than the inclination angle β (installation angle of the steering column 6a) of the center axis of the steering column 6a with respect to the forward-backward direction B (α>β). By making the inclination angle α of the long holes in the up-down direction greater than the installation angle β of the steering column 6a, displacement of the adjustment rod 22 such that the adjustment rod 22 rises upward along the hole 21a in the up-down direction is prevented regardless of the component force that occurs due to engagement between the outer circumferential surface of the adjustment rod 22 and the front side edges of the long holes 21a in the up-down direction due to a secondary collision. In this case, it is possible to properly maintain the collision position between an airbag installed in the steering wheel 1 and the driver, and thus it is possible to ensure the effect of the airbag reducing the impact. Moreover, it is possible to effectively transmit the force that acts during a secondary collision in a direction that causes the entire length of the steering column 6a to contract such that the impact is smoothly absorbed by the contraction of the steering column 6a. However, even in JP 2010-052639 (A), technology for reducing the impact that is applied to the driver's body when the adjustment rod 22 is forcibly pressed against the front edges of the long holes 21a in the up-down direction is not disclosed.

SUMMARY OF INVENTION

In consideration of the situation described above, the present invention aims to provide construction of a steering column apparatus that is able to reduce impact that is applied to the driver's body during a secondary collision even when the adjustment rod is forcibly pressed against the front edges of the long holes in the up-down direction.

The steering column apparatus of the present invention has: a steering column, a displacement bracket, a through hole, a support bracket, long holes in the up-down direction, and an expansion/contraction apparatus.

The steering column has a means supporting a steering shaft so as to be freely rotate in a state where the steering shaft which fixes and supports a steering wheel at the rear end portion thereof is inserted in the axial direction through the steering column, and the front end portion of the steering column is supported by a portion that is fastened to the vehicle body so as to be able to pivotally displace around a pivot shaft that is arranged in the width direction. The displacement bracket is fastened to the middle portion in the axial direction of the steering column so as to protrude downward or upward from the steering column. The through hole is formed so as to pass in the width direction through the displacement bracket.

In the case that the steering column apparatus has a telescopic mechanism for adjusting the forward-backward position of the steering wheel, the through hole is constructed by a long hole in the forward-backward direction that extends in the axial direction of the steering column, and in the case that the steering column apparatus does not have a telescopic mechanism, the though hole is constructed by a simple circular hole.

The support bracket has a pair of support plate portions, and is supported by the vehicle body with these support plate portions arranged on left and right sides of the displacement bracket. The long holes in the up-down direction are provided in portions of the pair of support plate portions that are aligned with the through hole.

The expansion/contraction apparatus has an adjustment rod that is inserted through the long holes in the up-down direction and the through hole, a pair of pressure portions that are provided in portions of the adjustment rod that are located on both sides in the width direction of the support plate portions, and a mechanism that expands or contracts the space between the pressure portions according to operation of an adjustment lever that is provided on one end portion of the adjustment rod that protrudes from the outside surface of one of the support plate portions. By pivotally displacing the adjustment lever in a specified direction, the space between the pressure portions is expanded and the up-down position of the steering wheel can be adjusted. On the other hand, by pivotally displacing the adjustment lever in a direction opposite the specified direction, the space between the pressure portions is contacted and the steering wheel can be maintained in the adjusted up-down position.

In the steering column apparatus of the present invention in particular, through holes and bridge portions are provided in part of the pair of support plate portions. In other words, the through holes are formed in portions of the pair of support plate portions further on the front side than the long holes in the up-down direction, and are continuous along the long holes in the up-down direction from the top end portion to the bottom end portion of the long holes in the up-down direction, and have a dimension in the up-down direction that is equal to or greater than the dimension in the up-down direction of the long holes in the up-down direction. Moreover, the bridge portions are provided between the front side edges of the long holes in the up-down direction and the rear side edges of the through holes. These bridge portions are able to plastically deform due to an impact load that is applied from the steering column in the forward direction by way of the adjustment rod during a collision accident.

In the steering column apparatus of the present invention, it is preferable to form cut out portions having a width dimension that is smaller than the outer diameter of the adjustment rod are formed on both end portions in the up-down direction of the long holes in the up-down direction so as to protrude upward and downward from the both end portions in the up-down direction of the long holes in the up-down direction. By providing these cut out portions, the bridge portions are able to plastically deform in the forward direction more easily due to an impact load that is applied to the bridge portions from the adjustment rod.

Moreover, it is preferable that the rear side edges of both side edges in the forward-backward direction of the through holes are parallel with the front side edges of both side edges in the forward-backward direction of the long holes in the up-down direction. Also, these through holes are formed such that the width dimension in the forward-backward direction thereof becomes wider in the downward direction. In this case, the shape of these through holes can be triangular, rectangular trapezoidal, elliptical, droplet shaped or the like.

However, in this construction, the long holes in the up-down direction can be long holes that have a partial arc shape around the pivot shaft, which is the pivot center of the steering column, or can be long holes that extend in a tangential direction of the partial arc. In this case, it is preferable that the inclination angle of the front end edges of the through holes with respect to a virtual plane that is orthogonal to the center axis of the steering column is greater than the inclination angle of the center axis of the steering column with respect to the forward-backward direction, regardless of the up-down position of the steering wheel.

It is preferable that the long holes in the up-down direction are formed so as to be inclined at a specified angle with respect to a virtual plane that is orthogonal to the center axis of the steering column, and formed so as to extend downward in the forward direction. The specified angle is larger than the inclination angle of the center axis of the steering column with respect to the forward-backward direction, regardless of the up-down position of the steering wheel.

In the steering column apparatus of the present invention, it is preferable that the expansion/contraction apparatus is constructed as described below. First, an adjustment lever is rotatably provided on the one end portion of the adjustment rod of the expansion/contraction apparatus. The pair of pressure portions are constructed by a driven cam that fits around the portion near the one end in the middle portion of the adjustment rod, and a large diameter portion on the other end side that is provided on the other end portion of the adjustment rod in a state such that displacement in a direction going away from the support plates is prevented. The driven cam engages in one of the long holes in the up-down direction so as to be able to displace only along the one long hole in the up-down direction, and the base end portion of the adjustment lever is connected to the one end portion of the adjustment rod such that displacement of the base end portion of the adjustment lever in a direction going away from the driven cam is prevented by a large diameter portion on one end side that is provided on the one end portion of the adjustment rod.

Moreover, the mechanism that expands or contracts a space between the pressure portions is constructed by a cam apparatus that has a driving cam that is provided on the base end portion of the adjustment lever and pivotally displaces together with the adjustment lever, and the driven cam, where by pivotally displacing the adjustment lever in a specified direction, the dimension in the axial direction of the cam apparatus is reduced, and the space between the pressure portions is expanded, and by pivotally displacing the adjustment lever in the direction opposite the specified direction, the dimension in the axial direction of the cam apparatus is expanded, and the space between the pressure portions is contracted.

Furthermore, a long hole on the driven side that extends in the forward-backward direction is provided in the center portion of the driven cam; a long hole on the driving side that extends in the forward-backward direction in a state where the dimension in the axial direction of the cam apparatus is expanded by pivotally displacing the adjustment lever in a direction opposite the specified direction and the steering wheel is maintained in the adjusted position in the up-down direction, is provided in the center portion of the driving cam; a long hole on the other end side that extends in the forward-backward direction is provided in the center portion of the large diameter portion on the other end side; and the adjustment rod is inserted through the long hole on the driven side, the long hole on the driving side, and the long hole on the other end side.

With the steering column apparatus of the present invention, construction that is able to reduce impact that is applied to the driver's body when the adjustment rod is strongly pressed against the front edges of the long holes in the up-down direction during a secondary collision.

In other words, when the displacement bracket displaces in the forward direction together with the steering column with a secondary collision where the driver's body collides with the steering wheel, the rear end edges of through holes that are formed in the displacement bracket collide with the portions near the rear of the outer circumferential surface of the adjustment rod, which applies an impact load in the forward direction to the adjustment rod. Then, due to this impact load, the portion near the front of the outer circumferential surface of the adjustment rod is strongly pressed against the front side edges of the long holes in the up-down direction that are formed in the pair of left and right support plate portions, which applies an impact load in the forward direction to portions of these support plate portions that are adjacent to the front side of the long holes in the up-down direction. The portions that are adjacent to the front side of these long holes in the up-down direction are narrow bridge portions that are located between the long holes in the up-down direction and through holes that are provided in portions further toward the front side than the long holes in the up-down direction, and these bridge portions are able to plastically deform in the forward direction due to relatively small loads.

Therefore, during the initial stage of a secondary collision, the adjustment rod displaces in the forward direction due to a relatively weak force with plastically deforming the bridge portions in the forward direction. Moreover, part of the impact energy that is applied to the steering wheel from the driver's body is absorbed due to the plastic deformation of the bridge portions during the displacement, which reduces the impact that is applied to the driver's body.

The through holes are provided so as to be continuous along the long holes in the up-down direction from the top end portion to the bottom end portion of the long holes in the up-down direction, so regardless of the up-down position of the adjustment rod inside these long holes in the up-down direction, the bridge portions plastically deform during a secondary collision, and thus it is possible to reduce the impact that is applied to the driver's body during the secondary collision.

Moreover, in a preferred embodiment of the steering column apparatus of the present invention, it is possible to more completely protect the driver during a secondary collision, by plastically deforming the bridge portions smoothly, regardless of the position of the adjustment rod inside the long holes in the up-down direction, or by preventing the displacement in the upward direction of the adjustment rod inside the long holes in the up-down direction as the secondary collision advances, so as to suitably maintain the positional relationship between the driver and an airbag, which is inflated on the rear side of the steering wheel.

BRIEF DESCRIPTION OF THE DRAWINGS

FIGS. 6A and 6B are side views illustrating the support bracket and pressure members, where FIG. 6A illustrates the state during normal operation, and FIG. 6B illustrates the state after a secondary collision.

DETAILED DESCRIPTION OF THE PREFERRED EMBODIMENTS

FIG. 1 to FIG. 6 illustrate an example of an embodiment of the present invention. In this example, the steering column apparatus of the present invention is applied to a tilt and telescopic steering apparatus in which a telescopic mechanism is provided in addition to a tilt mechanism. The steering column apparatus of this example has a steering column 6b, a displacement bracket 18a, long holes (through holes) 19a in the forward-backward direction of the displacement bracket 18a, a support bracket 12a, long holes 21b in the up-down direction of the support bracket 12, through holes 32 of the support bracket 12, and an expansion/contraction apparatus 24. In construction in which the telescopic mechanism is omitted, instead of the long holes 19a in the forward-backward direction, the though holes of the displacement bracket 18a is constructed by simple circular holes.

In this example, the steering column 6b has telescopic construction that is capable of extending and contracting the entire length of the steering column 6b by fitting together the front end portion of an outer column 13a arranged on the rear side thereof and the rear end portion of an inner column 14a arranged on the front side thereof such that relative displacement of the outer column 13a and the inner column 14a is possible in the axial direction. A steering shaft 5a is supported on the inside of the steering column 6b so as to be able to rotate freely. This steering shaft 5a is constructed so as to be able to transmit torque and be able to extend and contract the entire length of the steering shaft 5a by fitting together the front end portion of a tube shaped outer shaft 15a that is arranged on the rear side with the rear end portion of an inner shaft 16a that is arranged on the front side with a spline fit. The portion near the rear end of the middle portion of the outer shaft 15a is supported on the inside of the rear end portion of the outer column 13a, and the portion near the front end of the middle portion of the inner shaft 16a is supported on the inside of the front end portion of the inner column, respectively by single-row deep groove ball bearings and the like that are capable of supporting a radial load and an axial load, so as to be able to rotate freely. A steering wheel 1 (see FIG. 7) is supported by and fastened to the portion on the rear end portion of the steering shaft 5a (outer shaft 15a) that protrudes from the opening on the rear end of the outer column 13a. A pivot support bracket 25 is welded and fastened to the top surface of the front end portion of the inner column 14a, and this pivot support bracket 25 is supported by the vehicle body 10 by way of a horizontal shaft 11a that is arranged in the width direction so as to be able to pivotally displace.

Displacement bracket 18a is fastened to the front end portion of the outer column 13a, which corresponds to the middle portion in the axial direction of the steering column 6b, so as to protrude downward from the outer column 13a. In this example, the outer column 13a is integrally formed with the displacement bracket 18a by die casting of a light metal alloy such as an aluminum alloy. The displacement bracket 18a is constructed by a pair of supported plate portions 26 that are separated in the width direction. Long holes 19a in the forward-backward direction are formed in positions in these supported plate portions 26 that are aligned with each other, and the long holes 19a in the forward-backward direction are formed so as to pass through the displacement bracket 18a in the width direction.

Moreover, the support bracket 12a has a pair of left and right support plate portions 20a and a pair of left and right installation plate portions 27 that are formed by bending a metal plate such as steel plate that has sufficient strength and rigidity. In this example, a pair of left and right support bracket elements 28 each having a support plate portion 20a and an installation plate portion 27 are welded and fastened together by way of a connecting plate portion 29 to form the support bracket 12a. The support bracket 12a is such that the installation plate portions 27 are supported by the vehicle body 10 by locking capsules 30 and bolts 31 so as to be able to break away in the forward direction due to impact during a secondary collision. The construction of this portion is conventionally known, so the detailed illustration and explanation are omitted. With the support bracket 12a supported by the vehicle body 10, as described above, displacement bracket 18a is held from left and right by the support plate portions 20a.

In the pair of left and right support plate portions 20a of the support bracket 12a that is located between the vehicle body 10 and the displacement bracket 18a in this way, long holes 21b in the up-down direction and through holes 32 are formed. The long holes 21b in the up-down direction extend in the up-down direction, and are formed in positions that are aligned with part of the long holes 19a in the forward-backward direction, and are more inclined in a direction downward toward the front. In this example, as in the case of the conventional construction illustrated in FIG. 8, the inclination angle of the long holes 21b in the up-down direction with respect to a virtual plate that is orthogonal to the center axis of the steering column 6b is greater than the inclination angle of center axis of the steering column 6b. Furthermore, cut out portions 33 are formed in the center portion in the width direction of both end portions in the up-down direction of the long holes 21b in the up-down direction so as to protrude upward and downward from both end portions in the up-down direction of the long holes 21b in the up-down direction. The width dimension of these cut out portions 33 is sufficiently narrower than the width dimension of the long holes 21b in the up-down direction such that the adjustment rod 22a that is inserted into the long holes 21b in the up-down direction does not enter. Moreover, a circular wide portion is formed on the rear end portions of each of the cut out portions 33, such that the width dimension of the cut out portions 33 easily expands during a secondary collision.

Moreover, the through holes 32 are formed in portions of the side plate portions 20a that are further on the front side than the long holes 21b in the up-down direction so as to be continuous along the long holes 21b in the up-down direction from the top end portion to the bottom end portion of the long holes 21b in the up-down direction. Therefore, the through holes 32 have a dimension in the up-down direction that is equal to or greater than the dimension in the up-down direction of the long holes 21b in the up-down direction. In this example, the shape of the through holes 32 is approximately a triangular shape such that the width dimension in the forward-backward direction of the portions that correspond to the main portions of the long holes 21b in the up-down direction (portions except the cut out portions 33) becomes gradually larger in the downward direction. However, the shape of the through holes 32 is not limited to a triangular shape, and could be rectangular trapezoidal, elliptical, droplet shaped or the like. Moreover, in this example, the edges on the rear side of the through holes 32 are parallel with the front side edges of the long holes 21b in the up-down direction. In this way, a bridge portion 34, which is able to plastically deform in the forward direction due to an impact load that is applied in the forward direction from the steering column 6b by way of the adjustment rod 22a during a collision accident, is formed along the entire length of the through hole 32 between the front side edge of the long hole 21b in the up-down direction and the rear side edge of the through hole 32. The cut out portions 33 function to making it easier for the bridge portion 34 to displace in the forward direction or plastically deform due to an impact load that is applied to the bridge portion 34 from the adjustment rod 22a.

The expansion/contraction apparatus 24 has an adjustment rod 22a, a cam apparatus 35, an adjustment lever 23, a strike plate 36 and a nut 37. The cam apparatus 35 is constructed by combining a driving cam 38 and a driven cam 39, where the driving cam 38 is fastened to the base end portion of the adjustment lever 23 so as to be able to be driven by the adjustment lever 23 in the direction of rotation around the adjustment rod as the center of rotation. The surfaces of the driving cam 38 and the driven cam 39 that face each other are cam surfaces that are uneven in circumferential direction, and are such that the dimension in the axial direction of the cam apparatus can be expanded or contracted based on the relative rotation between the driving cam 38 and the driven cam 39. In this example, a pair of pressure portions is formed by the strike plate 36 and the driven cam 39, such that the driven cam 39 is one pressure portion, and the strike plate 36 is the other pressure portion. Moreover, the cam apparatus 35 that is constructed by the driving cam 38 and the driven cam 39 forms a mechanism that expands or contracts the space between these pressure portions.

A convex portion 40a that extends in the up-down direction is formed on the inside surface of the driven cam 39. The convex portion 40a engages with one of the long holes 21b in the up-down direction (the long hole 21b in the up-down direction on the right side in FIG. 2) so as to be able to displace only along the long holes 21b in the up-down direction, or in other words, is in a state such that rotation around the adjustment rod 22a is prevented. In the meantime, a convex portion 40b that extends in the up-down direction is also formed on the inside surface of the strike plate 36. The convex portion 40b engages with the other long hole 21b in the up-down direction (the long hole 21b in the up-down direction on the left side in FIG. 2) so as to only be able to displace along this long hole 21b in the up-down direction. The adjustment rod 22a is loosely inserted through the center holes 41a, 41b, and 41c respectively formed in the driving cam 38, the driven cam 39, and the strike plate 36. Moreover, an outward-facing flange shaped rim portion 42 is formed around the base end portion, which is one end portion of the adjustment rod 22a such that the driving cam 38 does not come out from the adjustment rod 22a toward the base end side. With respect to the adjustment rod 22a, the rim portion 42 is a large-diameter portion on one end side, and the strike plate 36 is a large-diameter portion on the other end side. Furthermore, by screwing a nut 37 on the tip end portion of the other end portion of the adjustment rod 22a that protrudes from the outside surface of the strike plate 36, the space between the driven cam 39 and the strike plate 36, which constitute the pair of pressure portions, is prevented from expanding. After the nut 37 has been screwed to a specified position on the tip end portion of the adjustment rod 22a, it can be prevented from becoming loose by plastically deforming the screwed portion, or pressure fitting a pin in the screwed portion.

Moreover, the center holes 41a, 41b and 41c are each long holes that extend in the forward-backward direction. In a normal state, the adjustment rod 22a is located at the rear end portion of these center holes 41a, 41b and 41c. Furthermore, in this state, the center axis of the adjustment rod 22a, and the center axes of the driven cam 39, driving cam 38 and strike plate 36 substantially match except for small differences due to manufacturing error or the like. In regards to the center hole 41a that is formed in the driving cam 38, the length direction thereof and the axial direction of the steering column 6b coincide when the adjustment lever 23 has been rotated to the state where the steering wheel 1 is maintained in the adjusted position (typically the uppermost position) and the dimension in the axial direction of the cam apparatus 35 is expanded. Therefore, in the state in which the steering wheel 1 is maintained in the adjusted position, a relatively large space exists between the outer circumferential surface of the adjustment rod 22a and the inner circumferential surfaces on the front end portion of the center holes 41a, 41b, and 41c.

In the construction of this example, when adjusting the up-down position and/or the forward-backward position of the steering wheel 1, the adjustment lever 23 is rotated in a specified direction (downward) to reduce the dimension in the axial direction of the cam apparatus 35. As a result, the space between the driven cam 39 and the strike plate 36 is expanded, and the surface pressure at the contact area between the inside surfaces of the support plate portions 20a and the outside surfaces of the displacement bracket 18a is decreased or lost, making it possible to adjust the up-down position of the steering wheel 1. At the same time, the space between the supported plate portions 26 of the displacement bracket 18 is elastically expanded. As a result, the inner diameter of the front end portion of the outer column 13a elastically expands and the surface pressure at the engagement area between the inner circumferential surface on the front end portion of the outer column 13a and the outer circumferential surface on the rear end portion of the inner column 14a is decreased or lost, making it possible to adjust the forward-backward position of the steering wheel 1.

In this state, after the steering wheel 1 has been moved to a desired position, the adjustment lever 23 is rotated in a direction opposite to the specified direction (upward) to expand the dimension in the axial direction of the cam apparatus 35. As a result, the space between the strike plate 36 and the driven cam 39 is reduced, the surface pressure at the contact area between the inside surfaces of the support plate portions 20a and the outside surfaces of the displacement bracket 18a increases, and the steering wheel 1 is maintained in the adjusted up-down position. At the same time, the inner diameter of the front end portion of the outer column 13a is reduced, the surface pressure at the engagement area between the inner circumferential surface of the front end portion of the outer column 13a and the outer circumferential surface of the rear end portion of the inner column 14a increases, and the steering wheel 1 is maintained in the adjusted forward-backward position.

A collision accident occurs when the steering wheel 1 is maintained in a desired position, and the displacement bracket 18a displaces in the forward direction together with the steering column 6b due to a secondary collisions that occurs with the collision accident. With the forward-backward position of the steering wheel 1 moved to the adjustable foremost position, the rear end edges of the long holes 19a in the forward-backward direction that are formed in the displacement bracket 18a collide with the portions near the rear of the outer circumferential surface of the adjustment rod 22a. This collision applies an impact load on the adjustment rod 22a in the forward direction. The center holes 41a, 41b, and 41c in the driven cam 39, driving cam 38, and strike plate 36 through which the adjustment rod 22a is inserted are long holes that extend in the forward-backward direction, so during a secondary collision, the adjustment rod 22a displaces in the forward direction independently from these members 36, 38, and 39.

Therefore, the portion near the front of the outer circumferential surface of the adjustment rod 22a is forcibly pressed against the front side edges of the long holes 21b in the up-down direction that are formed in the support plate portions 20a not by way of these members 36, 38 and 39. Then, the bridge portions 34 that are located in the portions adjacent to the front side of these long holes 21b in the up-down direction plastically deform toward the front with a relatively small load. As a result, during the initial stage of the secondary collision, the adjustment rod 22a displaces in the forward direction with a relatively small force while the bridge portions 34 plastically deform in the forward direction. Moreover, part of the impact energy that is applied to the steering wheel 1 from the driver's body is absorbed by the plastic deformation of the bridge portions 34 due to this displacement, and the impact that is applied to the driver's body is reduced.

The through holes 32 are formed so as to be continuous along the long holes 21b in the up-down direction from the top end portion to the bottom end portion of the long holes 21b in the up-down direction, so regardless of the up-down position of the adjustment rod 22a inside the long holes 21b in the up-down direction, the bridge portions 34 can plastically deform during a secondary collision to reduce the impact that is applied to the driver's body during a secondary collision. In the case of the construction of this example, cut out portions 33 are formed in both end portions in the up-down direction of the long holes 21b in the up-down direction, so it also becomes easy for both end portions in the up-down direction of the long holes 21b in the up-down direction to plastically deform. Therefore, even when the adjustment rod 22a is located in portions near the end portions in the up-down direction of the long holes 21b in the up-down direction (the steering wheel 1 is located at the adjustable top end position or the adjustable bottom end position), the bridge portions 34 smoothly deform plastically, so it is possible to more completely protect the driver during a secondary collision.

In this example, the inclination angles of the front side edges of the long holes 21b in the up-down direction and the through holes 32 with respect to the horizontal direction is less than the inclination angle of the arc around the pivot shaft 11a, so the adjustment rod 22a is prevented from displacing above the long holes 21b in the up-down direction as a secondary collision advances. In other words, by limiting the inclination angles of the front end edges of the long holes 21b in the up-down direction and the through holes 32 in this way, a force component in the upward direction is no longer applied to the adjustment rod 22a during a secondary collision, and thus the steering column 6b that is supported by the adjustment rod 22a does not pivot upward around the pivot shaft 11a. As a result, the positional relationship between the driver and an airbag that is inflated on the rear side of the steering wheel 1 can be properly maintained, so the driver can be more completely protected.

In the case of embodying the present invention, the inclination angle α of the long holes 21b in the up-down direction with respect to a virtual plane A that is orthogonal to the center axis of the steering column 6b (see FIG. 8) does not necessarily have to be greater than the inclination angle β of the center axis of the steering column 6b with respect to the forward-backward direction B (see FIG. 8). In other words, in construction wherein the rear side edges of the through holes 32 are parallel with the front side edges of the long holes 21b in the up-down direction, and the width dimension in the forward-backward direction of these through holes 32 becomes wider in the downward direction, as in a typical tilt steering apparatus, the long holes 21b in the up-down direction can be a partial arc shape around the pivot shaft 11a, which is the pivot center of the steering column 6b, or can extend in a tangential direction to this partial arc.

When this kind of construction is employed, the long holes 21b in the up-down direction do not have a function themselves that keeps the steering wheel from moving upward during a secondary collision. However, by making the through holes 32 that are provided on the front side of the long holes 21b in the up-down direction so as to become wider in the downward direction, and such that the inclination angle of the front side edges of these through holes 32 is greater than the inclination angle of the center axis of the steering column 6b, it is possible to prevent the steering wheel from moving upward. In other words, the bridge portions 34 that are located between the long holes 21b in the up-down direction and the through holes 32 plastically deform in the forward direction and come in contact with the front side edges of the through holes 32 before a force that is strong enough to cause the steering wheel to move upward acts on the adjustment rod 22a. In this state, the component force in the upward direction no longer acts at the contact area between the front side edges of the long holes 21b in the up-down direction and the outer circumferential surface of the adjustment rod 22a, so the steering wheel is prevented from moving upward.

The steering column apparatus of the present invention can be widely applied to tilt steering apparatuses having a tilt mechanism for adjusting the up-down position of the steering wheel regardless of whether or not a telescopic mechanism is employed.

What is claimed is:

1. A steering column apparatus, comprising:
    a steering column having a structure supporting a steering shaft so as to rotate freely in a state where the steering shaft which fixes and supports a steering wheel at a rear end portion thereof is inserted in an axial direction through the steering column, and a front end portion that is supported by a portion fastened to a vehicle body so as to be able to oscillate around a pivot shaft that is arranged in a width direction;
    a displacement bracket fastened to a middle portion in the axial direction of the steering column;
    a through hole formed so as to pass through the displacement bracket in the width direction;
    a support bracket having a pair of support plate portions, and being supported by the vehicle body with the support plate portions arranged on left and right sides of the displacement bracket;
    long holes in an up-down direction provided in portions of the pair of support plate portions that are aligned with the through hole;
    an expansion/contraction apparatus having: an adjustment rod that is inserted through the long holes in the up-down direction and the through hole, a pair of pressure portions that are provided in portions of the adjustment rod located on both sides of the support plate portions in the width direction, and a mechanism configured to expand or contract a space between the pressure portions according to operation of an adjustment lever that is provided on one end portion of the adjustment rod that protrudes from an outside surface of one of the support plate portions;

through holes formed in portions of the pair of support plate portions further on the front side than the long holes in the up-down direction, the through holes being continuous along the long holes in the up-down direction from a top end portion to a bottom end portion of the long holes in the up-down direction, and the through holes having a dimension in the up-down direction that is equal to or greater than the dimension in the up-down direction of the long holes in the up-down direction; and bridge portions provided between front side edges of the long holes in the up-down direction and rear side edges of the through holes, the bridge portions being able to plastically deform due to an impact load that is applied from the steering column in a forward direction by way of the adjustment rod during a collision accident, wherein cut out portions having a width dimension that is less than an outer diameter of the adjustment rod are formed on both end portions in the up-down direction of the long holes in the up-down direction so as to protrude upward and downward from the both end portions in the up-down direction of the long holes in the up-down direction.

2. A steering column apparatus, comprising:

a steering column having a structure supporting a steering shaft so as to rotate freely in a state where the steering shaft which fixes and supports a steering wheel at a rear end portion thereof is inserted in an axial direction through the steering column, and a front end portion that is supported by a portion fastened to a vehicle body so as to be able to oscillate around a pivot shaft that is arranged in a width direction;

a displacement bracket fastened to a middle portion in the axial direction of the steering column;

a through hole formed so as to pass through the displacement bracket in the width direction;

a support bracket having a pair of support plate portions, and being supported by the vehicle body with the support plate portions arranged on left and right sides of the displacement bracket;

long holes in an up-down direction provided in portions of the pair of support plate portions that are aligned with the through hole;

an expansion/contraction apparatus having: an adjustment rod that is inserted through the long holes in the up-down direction and the through hole, a pair of pressure portions that are provided in portions of the adjustment rod located on both sides of the support plate portions in the width direction, and a mechanism configured to expand or contract a space between the pressure portions according to operation of an adjustment lever that is provided on one end portion of the adjustment rod that protrudes from an outside surface of one of the support plate portions;

through holes formed in portions of the pair of support plate portions further on the front side than the long holes in the up-down direction, the through holes being continuous along the long holes in the up-down direction from a top end portion to a bottom end portion of the long holes in the up-down direction, and the through holes having a dimension in the up-down direction that is equal to or greater than the dimension in the up-down direction of the long holes in the up-down direction; and bridge portions provided between front side edges of the long holes in the up-down direction and rear side edges of the through holes, the bridge portions being able to plastically deform due to an impact load that is applied from the steering column in a forward direction by way of the adjustment rod during a collision accident, wherein rear side edges of the through holes are parallel with front side edges of the long holes in the up-down direction, and a width dimension in a forward-backward direction of the through holes becomes wider in a downward direction.

3. The steering column apparatus according to claim 2, wherein an inclination angle of front end edges of the through holes with respect to a virtual plane that is orthogonal to the center axis of the steering column, is greater than an inclination angle of the center axis of the steering column with respect to a forward-backward direction regardless of an up-down position of the steering wheel.

4. A steering column apparatus, comprising:

a steering column having a structure supporting a steering shaft so as to rotate freely in a state where the steering shaft which fixes and supports a steering wheel at a rear end portion thereof is inserted in an axial direction through the steering column, and a front end portion that is supported by a portion fastened to a vehicle body so as to be able to oscillate around a pivot shaft that is arranged in a width direction;

a displacement bracket fastened to a middle portion in the axial direction of the steering column;

a through hole formed so as to pass through the displacement bracket in the width direction;

a support bracket having a pair of support plate portions, and being supported by the vehicle body with the support plate portions arranged on left and right sides of the displacement bracket;

long holes in an up-down direction provided in portions of the pair of support plate portions that are aligned with the through hole;

an expansion/contraction apparatus having: an adjustment rod that is inserted through the long holes in the up-down direction and the through hole, a pair of pressure portions that are provided in portions of the adjustment rod located on both sides of the support plate portions in the width direction, and a mechanism configured to expand or contract a space between the pressure portions according to operation of an adjustment lever that is provided on one end portion of the adjustment rod that protrudes from an outside surface of one of the support plate portions;

through holes formed in portions of the pair of support plate portions further on the front side than the long holes in the up-down direction, the through holes being continuous along the long holes in the up-down direction from a top end portion to a bottom end portion of the long holes in the up-down direction, and the through holes having a dimension in the up-down direction that is equal to or greater than the dimension in the up-down direction of the long holes in the up-down direction; and bridge portions provided between front side edges of the long holes in the up-down direction and rear side edges of the through holes, the bridge portions being able to plastically deform due to an impact load that is applied from the steering column in a forward direction by way of the adjustment rod during a collision accident, wherein the long holes in the up-down direction are constructed by long holes that have a partial arc shape around the pivot shaft, or extend in a tangential direction to the partial arc.

5. A steering column apparatus, comprising:
a steering column having a structure supporting a steering shaft so as to rotate freely in a state where the steering shaft which fixes and supports a steering wheel at a rear end portion thereof is inserted in an axial direction through the steering column, and a front end portion that is supported by a portion fastened to a vehicle body so as to be able to oscillate around a pivot shaft that is arranged in a width direction;
a displacement bracket fastened to a middle portion in the axial direction of the steering column;
a through hole formed so as to pass through the displacement bracket in the width direction;
a support bracket having a pair of support plate portions, and being supported by the vehicle body with the support plate portions arranged on left and right sides of the displacement bracket;
long holes in an up-down direction provided in portions of the pair of support plate portions that are aligned with the through hole;
an expansion/contraction apparatus having: an adjustment rod that is inserted through the long holes in the up-down direction and the through hole, a pair of pressure portions that are provided in portions of the adjustment rod located on both sides of the support plate portions in the width direction, and a mechanism configured to expand or contract a space between the pressure portions according to operation of an adjustment lever that is provided on one end portion of the adjustment rod that protrudes from an outside surface of one of the support plate portions;
through holes formed in portions of the pair of support plate portions further on the front side than the long holes in the up-down direction, the through holes being continuous along the long holes in the up-down direction from a top end portion to a bottom end portion of the long holes in the up-down direction, and the through holes having a dimension in the up-down direction that is equal to or greater than the dimension in the up-down direction of the long holes in the up-down direction; and
bridge portions provided between front side edges of the long holes in the up-down direction and rear side edges of the through holes, the bridge portions being able to plastically deform due to an impact load that is applied from the steering column in a forward direction by way of the adjustment rod during a collision accident,
wherein the long holes in the up-down direction are formed so as to be inclined at a specified angle with respect to a virtual plane that is orthogonal to a center axis of the steering column so as to extend downward in the forward direction, and regardless of an up-down position of the steering wheel, the specified angle is larger than the inclination angle of the center axis of the steering column with respect to the forward-backward direction.

6. A steering column apparatus, comprising:
a steering column having a structure supporting a steering shaft so as to rotate freely in a state where the steering shaft which fixes and supports a steering wheel at a rear end portion thereof is inserted in an axial direction through the steering column, and a front end portion that is supported by a portion fastened to a vehicle body so as to be able to oscillate around a pivot shaft that is arranged in a width direction;
a displacement bracket fastened to a middle portion in the axial direction of the steering column;
a through hole formed so as to pass through the displacement bracket in the width direction;
a support bracket having a pair of support plate portions, and being supported by the vehicle body with the support plate portions arranged on left and right sides of the displacement bracket;
long holes in an up-down direction provided in portions of the pair of support plate portions that are aligned with the through hole;
an expansion/contraction apparatus having: an adjustment rod that is inserted through the long holes in the up-down direction and the through hole, a pair of pressure portions that are provided in portions of the adjustment rod located on both sides of the support plate portions in the width direction, and a mechanism configured to expand or contract a space between the pressure portions according to operation of an adjustment lever that is provided on one end portion of the adjustment rod that protrudes from an outside surface of one of the support plate portions;
through holes formed in portions of the pair of support plate portions further on the front side than the long holes in the up-down direction, the through holes being continuous along the long holes in the up-down direction from a top end portion to a bottom end portion of the long holes in the up-down direction, and the through holes having a dimension in the up-down direction that is equal to or greater than the dimension in the up-down direction of the long holes in the up-down direction; and
bridge portions provided between front side edges of the long holes in the up-down direction and rear side edges of the through holes, the bridge portions being able to plastically deform due to an impact load that is applied from the steering column in a forward direction by way of the adjustment rod during a collision accident,
wherein the expansion/contraction apparatus includes the adjustment lever that is rotatably provided on the one end portion of the adjustment rod, and the pair of pressure portions are constructed by a driven cam that fits around a portion near the one end in a middle portion of the adjustment rod, and a large diameter portion on other end side of the adjustment rod that is provided in a state such that displacement in a direction going away from the support plates is prevented; the driven cam engages in one of the long holes in the up-down direction so as to be able to displace only along the one long hole in the up-down direction; a base end portion of the adjustment lever is connected to the one end portion of the adjustment rod such that displacement of the base end portion of the adjustment lever in a direction going away from the driven cam is prevented by a large diameter portion on one end side that is provided on the one end portion of the adjustment rod,
wherein the mechanism that expands or contracts the space between the pressure portions is provided on the base end portion of the adjustment lever and is constructed by a cam apparatus that comprises a driven cam and a driving cam that oscillates together with the adjustment lever, and by pivotally displacing the adjustment lever in a specified direction, a dimension in an axial direction of the cam apparatus is reduced, and the space between the pressure portions is expanded, and by pivotally displacing the adjustment lever in a direction opposite to the specified direction, the dimension in the axial direction of the cam apparatus is expanded, and thus the space between the pressure portions is contracted, and wherein a long hole on a driven side that extends in the forward-backward direction is provided in a center portion of the driven cam; a long hole on a driving side that extends in the forward-backward direction in a state where the dimension in the axial direction of the cam apparatus is expanded by pivotally displacing the adjustment lever in a direction opposite the specified direction and the steering wheel is maintained in the adjusted position in the up-down direction, is provided in a center portion of the driving cam; a long hole on the other end side that extends in the forward-backward direction is provided in a center portion of the large diameter portion on the other end side; and the adjustment rod is inserted through the long hole on the driven side, the long hole on the driving side, and the long hole on the other end side.

\* \* \* \* \*